Sept. 15, 1964 A. LIEB 3,149,281

ELECTROLUMINESCENT VOLTAGE MEASURING DEVICE

Original Filed June 26, 1958

INVENTOR

A. Lieb

BY

ATTORNEY

United States Patent Office 3,149,281
Patented Sept. 15, 1964

3,149,281
ELECTROLUMINESCENT VOLTAGE
MEASURING DEVICE
Albert Lieb, Stuttgart-Bad Cannstatt, Germany, assignor to International Standard Electric Corporation, New York, N.Y., a corporation of Delaware
Original application June 26, 1958, Ser. No. 744,846. Divided and this application Mar. 1, 1961, Ser. No. 92,631
Claims priority, application Germany July 5, 1957
3 Claims. (Cl. 324—96)

This invention relates to a device for indicating the magnitude of an electric voltage by means of an electroluminescent panel.

This is a divisional application of my copending application Serial No. 744,846, filed June 26, 1958, and now abandoned.

Devices are known in which an electroluminescent substance is exposed to an electric field across a capacitor and is thus stimulated for the emission of light. In such arrangements the intensity of the light emission depends upon the magnitude of the electric field intensity, or the applied voltage. For this reason simple types of luminescent capacitors have already been used for the voltage indication, wherein the brightness of the excited luminescing layer served as a measure of the magnitude of the voltage. Such an indication, however, is very inaccurate, because the human eye is insensitive to smaller variations of the light emission.

For this reason it is one object of the present invention to achieve a clearly visible voltage indication with the aid of electroluminescent capacitors by variation of the luminous pattern in size. This is accomplished by a device for indicating the magnitude of an electric voltage, in which between two electrically conductive layers, of which at least the one is optically transparent, there is arranged an electro-luminescence substance. At least one of these coatings has an electrical resistance of such a high value that upon application of a voltage at the one end of this resistance a light emission will at first only substantially appear at this point and which, with increasing voltage, will continuously extend to further surface areas of the luminescent capacitor.

According to the invention a sharp boundary between the luminous and the nonluminous indicating area may be achieved by positioning between the two conductive coatings, an additional voltage-dependent layer whose resistance is changed or varied abruptly at a predetermined voltage level. It is particularly advantageous to employ a material, such as cadmium sulphide, which has the property of providing a voltage-dependent resistance layer.

Figure 1:
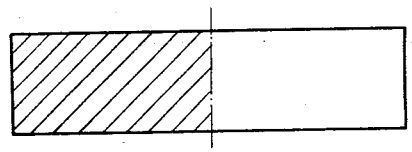
Figure 2:
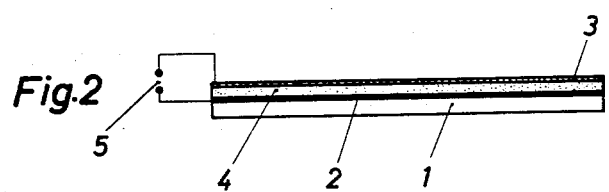
Figure 3:
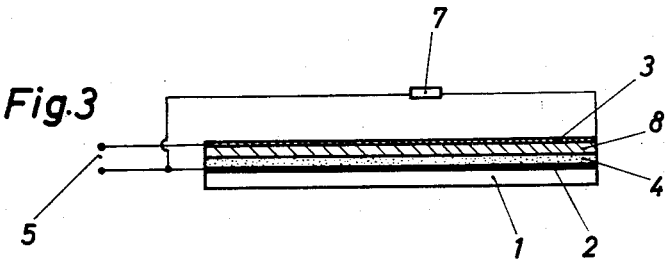

In the following the invention will now be described in particular with reference to the accompanying drawings in which:

FIG. 1 diagrammatically illustrates an indicating surface or area in which the indicating condition is illustrated by crosshatch lines;

FIG. 2 is a sectional view of an electroluminescence capacitor according to FIG. 1; and FIG. 3 is an example similar to FIG. 2 illustrating an embodiment of the invention.

To a suitable carrier or base 1, e.g. an optically transparent base of glass or mica there is applied a conductive layer 2 which may likewise be of the optically transparent type. Such a layer may be produced by evaporation of metals, such as aluminum, in a vacuum, or by causing vapors of metal salts, such as $SnCl_2$, $SnCl_4$ or $TiCl_4$ to react with the heated base. In the latter case there will be formed an electrically-conductive coating of metallic oxide. When employing SnO or TiO this coating will be transparent. On the electrically-conductive layer 2 there is arranged a layer of a suitably prepared electro-luminescent phosphor substance 4, such as zinc sulphide with a copper activator added in excess. The luminous substance is advantageously embedded in a dielectric having a high dielectric constant, e.g. in polyacrylic acid-ester.

The electroluminescent layer is followed by a resistance layer 3. This may be a thin layer of metal consisting e.g. of aluminum which is evaporated in the vacuum, or else of a layer of graphite which is applied by spraying. The lead-in conductors for the voltage exciting or electrically stimulating the luminous substance, such as by alternating voltage, are applied to the conductive layer 2 and to the resistance layer 3.

The value of the resistance is so chosen that upon application of the exciting voltage to the electrodes 2 and 3 there will appear a noticeable voltage drop along the resistance. In this way it is possible to achieve the result that the luminous area will be continuously and steadily enlarged in direction towards the gradient of the voltage drop upon application of the exciting voltage.

An example of an embodiment of the invention is shown in FIG. 3. In this case there is provided between the resistance layer 3 and the electroluminescent layer 4 a further layer 8, the electrical resistance of which is abruptly reduced upon increase of the applied voltage to a predetermined threshold value. Such a layer may e.g. consist of a known suitably prepared CdS or of silicon carbide. This arrangement has the advantage that the boundaries of the luminous pattern are particularly sharply distinguished. This will be apparent as the electroluminescent layer 4 will glow more brilliantly in the region extending from terminals 5 to the point on layer 4 at which the critical voltage is reached. By this the reading is substantially facilitated and the sensitivity is substantially increased. In this figure instead of depending only on the capacitive shunting between the conductive layers to provide the limit of the voltage drop there is provided a resistor 7 connected between one of the leads to voltage source 5. The other end of the resistor is connected with the far end of the resistance layer 3. Thus, there will be produced a voltage drop along resistance layer 3 dependent upon the value of resistor 7. The potential difference between resistance layer 3 and the coating 2 will differ from that at the terminal 5 by the voltage drop in the resistor 7.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A device for indicating the magnitude of an electric voltage by the variation in extent of a luminous pattern, comprising two electrically conducting coatings, of which at least one is optically transparent, one of said conducting coatings having an electrical resistance relatively higher than the other, a continuous voltage-dependent resistance layer the resistance of which changes abruptly at a predetermined voltage level to give a sharp boundary between the luminous and non-luminous pattern, a layer of electroluminescent substance continuously adjoining said voltage-dependent resistance layer, said electroluminescent substance and said resistance layer positioned between said coatings and having uniform thicknesses therealong, and means for applying a voltage between one end of said resistance coating and the other coating, whereby upon application of a predetermined voltage a light emission will at first only appear substantially at the point of application, but will continuously extend to further surface areas of the luminous pattern as the voltage is increased.

2. A device as claimed in claim 1, wherein said voltage-dependent resistance layer consists of cadmium sulphide.

3. A device according to claim 1, including a fixed resistive device connected between the other end of said higher resistance coating and said means for applying said voltage.

References Cited in the file of this patent
UNITED STATES PATENTS

| | | |
|---|---|---|
| 2,755,457 | Diemer | July 17, 1956 |
| 2,818,531 | Peek | Dec. 31, 1957 |
| 2,851,634 | Kazan | Sept. 9, 1958 |
| 2,928,974 | Mash | Mar. 15, 1960 |